United States Patent [19]

Carpenter

[11] 3,913,568

[45] Oct. 21, 1975

[54] NASOPHARYNGOSCOPE

[75] Inventor: George J. Carpenter, Southbridge, Mass.

[73] Assignee: American Optical Corporation, Southbridge, Mass.

[22] Filed: June 7, 1974

[21] Appl. No.: 477,543

Related U.S. Application Data

[63] Continuation of Ser. No. 325,299, Jan. 22, 1973, abandoned.

[52] U.S. Cl. ................................................. 128/11
[51] Int. Cl.² ............................................ A61B 1/06
[58] Field of Search ................................. 128/4–11

[56] References Cited
UNITED STATES PATENTS

| | | |
|---|---|---|
| 3,610,231 | 10/1971 | Takahashi et al ..................... 128/6 |
| 3,788,304 | 1/1974 | Takahashi ............................. 128/6 |
| 3,799,151 | 3/1974 | Fukaumi et al ....................... 128/4 |

*Primary Examiner*—Richard A. Gaudet
*Assistant Examiner*—Henry S. Layton
*Attorney, Agent, or Firm*—H. R. Berkenstock, Jr.; William C. Nealon

[57] ABSTRACT

An instrument for examining the nasopharnyx and larnyx or portions of the alimentary canal and for assisting in intubation of the trachea. The instrument comprises a tubular probe having an optical image-forming objective internally of its distal end and a flexible image-conducting bundle of optical fibers extending from an image plane adjacent the objective throughout the length of the probe. The distal end of the probe is internally vertebrated with remote control means extending to the proximal end of the probe for use in effecting articulation of the vertebrated distal end.

4 Claims, 4 Drawing Figures

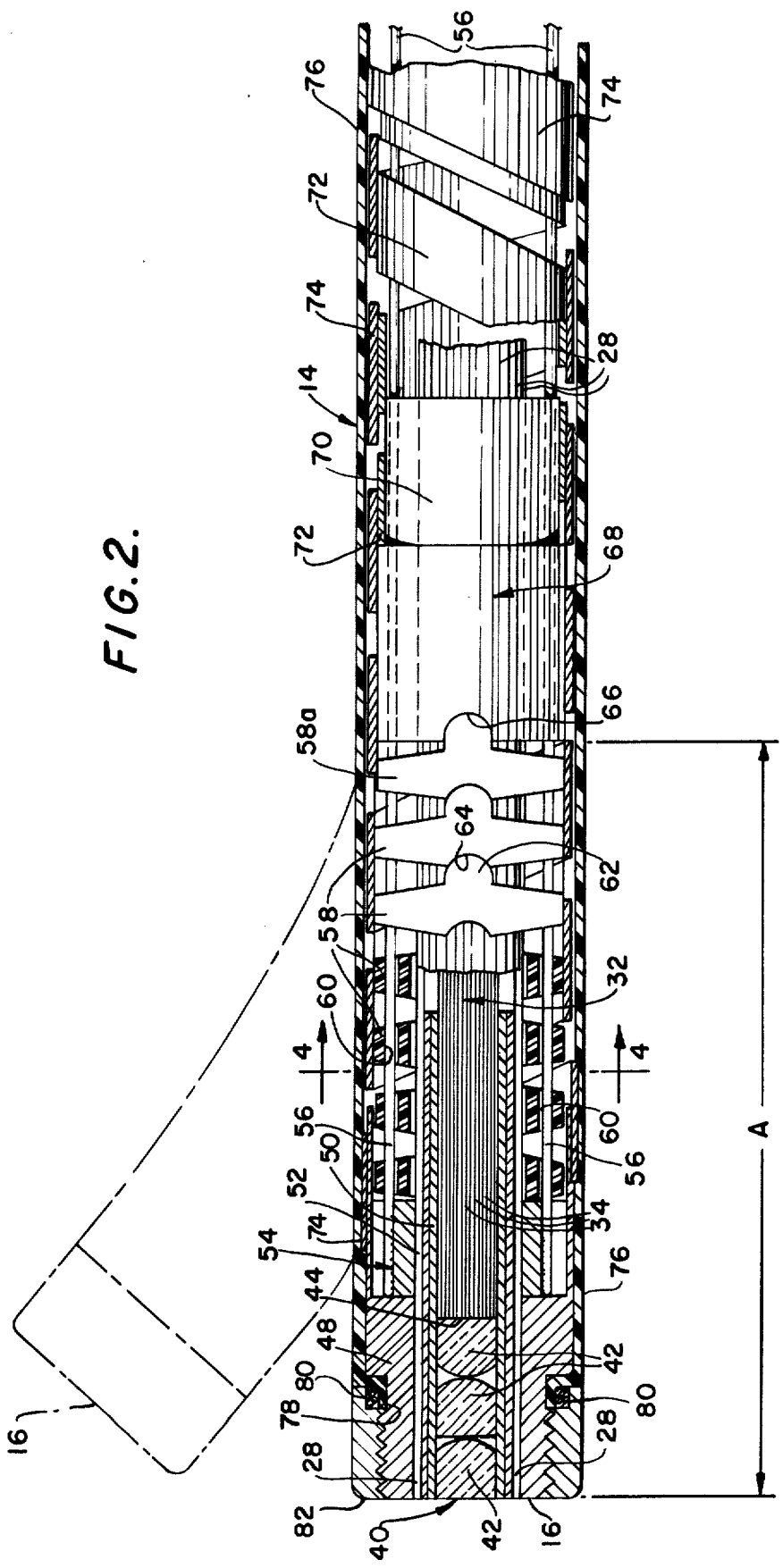

NASOPHARYNGOSCOPE

This is a continuation of application Ser. No. 325,299 filed Jan. 22, 1973, now abandoned.

BACKGROUND OF THE INVENTION

1. Field of the Invention

Medical encoscopic instruments with particular reference to a flexible fiber optic nasopharyngoscope.

2. Description of the Prior Art

In endoscopy, most of the alimentary canal can be examined with reasonable facility using instruments of the type shown and described in U.S. Pat. Nos. 3,091,235; 2,975,785; 3,071,161 and 3,190,286. Examination of the nasopharnyx and intubation of the trachea, however, present unusual problems.

Oral endotracheal intubation, having the serious drawbacks of tending to produce patient discomfort and trauma from gagging or aspiration of oral fluids and straining of the jaw or neck, is avoided whenever possible in favor of transnasal intubation. Although obviating many of the drawbacks of oral intubation, transnasal techniques, as practiced heretofor, have not been without problems. The reverse curve of the passage used to enter the larnyx and trachea from the nose is difficult to traverse safely with conventional endoscopes due to their ungainliness in size and limited amounts of distal articulation and/or absence of provision for articulation of their distal portions independently of intermediate and proximal portions.

Provision for greater control of distal articulation of endoscopes intended for examination and intubation of the trachea is a principal objective of the present invention, particularly in smaller than usual diametral sizes of fiberscope probes and over greater lengths of their distal portions than has been the case in endoscopic devices of the relatively large universally jointed type (e.g. U.S. Pat. No. 3,091,235) while permitting intermediate and proximal portions to flex freely and independently of the distal portions as opposed to articular tubular structures of the type disclosed in U.S. Pat. Nos. 3,162,241; 2,975,785; 3,071,161; and 3,190,286, for example.

SUMMARY OF THE INVENTION

The present invention accomplishes the foregoing objective with articulating means for fiberscopes which comprise, in each case, a vertebrated succession of rigid annuli, the number of which is preselected according to the length of distal articulation desired of the fiberscope probe. These annuli are manipulated remotely with operating wires for effecting a smoothly operating graduated bending over a substantial length of the fiberscope distal portion without effect upon intermediate and proximal portions of the probe; the latter portions being freely independently universally flexible.

The vertebrated unit is adaptable to manufacture and installation in fiberscopes of all diametral sizes. It is installed completely internally of a smooth surfaced fiberscope sheathing for protection of its vertebrae against contamination and operational interference with walls and the like of passageways or body cavities into which the instrument is inserted.

The invention will be more fully understood by reference to the following detailed description when taken in conjunction with the accompanying drawings.

DESCRIPTION OF THE DRAWINGS

FIG. 2 is a greatly enlarged cross-sectional view taken along line 2—2 of FIG. 1;

DESCRIPTION OF THE PREFERRED EMBODIMENTS

Figure 1:
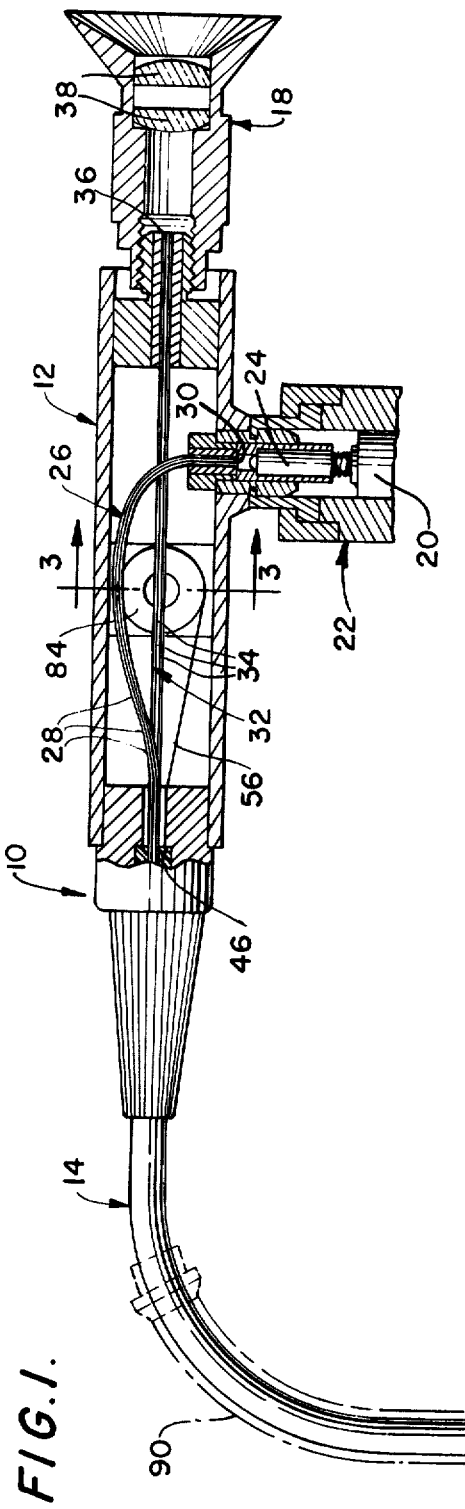
FIG. 1 is a partially cross-sectioned side elevational view of a preferred embodiment of the invention.

FIGS. 1–4 of the drawings illustrate a preferred embodiment of the invention which has been referred to hereinabove as a nasopharyngoscope since instrument 10 is applicable to examination of the nasal passages and pharnyx and is especially useful in the performance of transnasal endotracheal intubation. It is to be understood, however, that instrument 10 is not limited to the aforementioned uses. It may, for example, be used for examination of various portions of the alimentary canal or in the performance of oral endotracheal intubation.

Instrument 10 comprises a main body portion 12 from one end of which a fiber optic probe 14 extends and by means of which images of objects near the distal end 16 of the probe are formed within the probe and stransmitted into main body 12 of the instrument for viewing with eyepiece 18.

Figure 4:
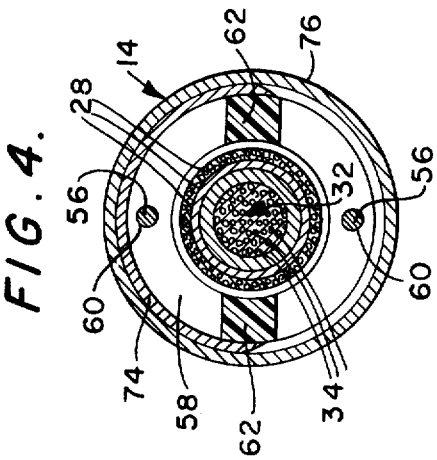
FIG. 4 is a cross-sectional view taken along line 4—4 of FIG. 2.

The particular fiber optic illuminating the image-transmitting means depicted in FIGS. 1, 2 and 4 includes a source of electrical energy, e.g. in the form of one or more dry cells 20 contained in battery handle 22. Battery handle 22 is attached to body 12 and contains lamp 24 which is energized by dry cells 20. A bundle 26 of optical light-conducting fibers 28 (FIGS. 1, 2 and 4), having their corresponding proximal ends grouped tightly together to form light-receiving face 30 adjacent lamp 24, receive and conduct light from lamp 24 through the length of probe 14 for emission outwardly therefrom upon objects desired to be viewed with instrument 10. Fibers 28, upon entering probe 14 from main body 12 are arranged in a hollow tubular configuration throughout the length of probe 14. Internally of the tubular configuration of fibers 28 is image-conducting bundle 32 of fibers 34 which extend through main body portion 12 of instrument 10 into eyepiece 18. The ends of fibers 34 in eyepiece 18 are arranged to form image-emitting face 36 which is magnified by eyepiece lenses 38 when viewed through eyepiece 18.

Adjacent the opposite distal end of image-conducting bundle 32 and contained within distal end 16 of probe 14 is optical objective 40 (FIG. 2). Objective 40 is comprised of three lens components 42 which form optical images of objects forwardly thereof during use of instrument 10. These images of objects, which are illuminated by light from fibers 28, are received by face 44 of bundle 32. Image-receiving face 44 is made up of tightly juxtaposed corresponding ends of fibers 34. These fiber ends are arranged in a geometrical pattern which corresponds to the geometrical patterning of opposite ends of fibers 34 at image-emitting face 36. Thus, bundle 32 is adapted to receiving and convey images of objects produced by objective 42 through probe 14 and main body portion 12 to image-emitting face 36 for viewing in eyepiece 18.

Those interested in greater details of the construction and principles of operation of optical illuminating and image-conducting bundles of fibers in elongated flexible bundles generally of the type shown and described with respect to the bundles 26 and 32 may refer to U.S. Pat. No. 3,033,721 and/or any one or more of the previously mentioned U.S. Patents.

In probe 14, fiber bundles 26 and 32 which are individually flexible throughout the major portion of their respective lengths are extended through proximal bushing 46 and anchored in fitting 48 at distal end 16 of the probe. Sleeves 50 and 52 which are respectively externally and internally of fiber bundles 32 and 26, support these bundles in coaxially separated relationship with each other in end fitting 48.

Referring more particularly to matters of probe 14 being distally internally vertebrated for controlled articulation of its distal end during use of the instrument 10 in the manner outlined hereinabove and for purposes already explained, anchor block 54 (FIG. 2) is fastened by solder or welding to end fitting 48. Wires 56, each welded or otherwise secured to block 54, extend therefrom longitudinally through the entire length of probe 14 into main body 12 of instrument 10.

Extending from anchor block 54 toward the proximal end of probe 14 is a series of vertebrated annuli 58 each loosely fitted over fiber bundle 26 and threaded upon wires 56, diametrically opposed openings through each annulus 58 being provided for accomplishing the latter. The number of annuli 58 is preselected according to the length A of the distal end of probe 14 desired to be articulable and the extent of bending desired. The seven annuli 58 shown in FIG. 2 of the drawing may be decreased or substantially increased in number. Each annulus 58 has a pair of diametrically opposed pivet lugs 62 seated in sockets 64 of an adjacent annulus to form pivotal connections of the vertebrated unit of annuli. The last annulus 58a of the series is similarly pivotally connected in diametrically opposed receiving sockets 66 (only one of which is shown) of a holding sleeve 68 which completes the vertebrated unit. Sleeve 68 is longitudinally slotted along its sides for receiving wires 56 from annuli 58.

Fixed to reduced shoulder portion 70 of holding sleeve 68, e.g. by welding, cementing or soldering, is elongated spiral coil 72 of flat spring-like material, preferably metal, which extends throughout the remaining length of probe 14. Coil 72, being laterally flexible in all directions permits easy free flexing of probe 14 in all directions while maintaining a uniformly diametrically dimensioned internal hollow cavity throughout the probe within which fiber bundles 26 and 32 are extended. This prevents crushing, pinching or undue abrasion of the fiber bundles during or as a result of lateral flexing of probe 14. A second similar spiral coil 74 extends from the proximal end of probe 14 over coil 72, holding sleeve 68, annuli 58 and one end of anchor block 54. This second spiral coil 74 is soldered or welded to block 54. It supports the unit of vertebrated annuli while permitting free lateral flexing of all flexible portions of the entire length of probe 14. An outer sheathing 76 in the form of a continuous thin wall of rubber-like material e.g. a urethane plastic, protects all internally disposed components of probe 14 from contamination during periods of storage and use and, importantly, provides a continuous, highly flexible and smooth outer surface for the probe. The end 78 of sheath 76 is fastened to fitting 48 with nylon thread, or its equivalent, and preferably sealed with an epoxy cement covering the thread and adjacent portions of the sheath. Cap 82 threaded upon fitting 48 covers end 78 of sheath 76. The outer surface of cap 82 is flush with the remaining outer surface of sheath 76.

Figure 3:
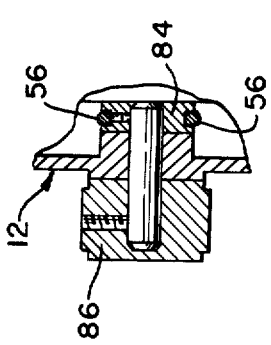
FIG. 3 is a fragmentary cross-sectional view taken along line 3—3 of FIG. 1.

Operator controlled articulation of the vertebrated section (length A) of probe 1 may be performed by applying a pulling force to one of wires 56 while releasing all tension on the other wire. While various lever operated means may be incorporated in or associated with main body 12 of instrument 10 for this purpose, a preferred embodiment of wire operating means is shown in FIGS. 1 and 3. This comprises a pulley 84 internally of main body 12 adapted to be operated externally of the main body by knob 86 (FIG. 3). In this particular arrangement of wire operating means, wires 56, FIGS. 1, 2 and 3 may be oppositely disposed legs of a continuous length of wirellooped tightly over pulley 84 or in the form of separate lengths having their proximal ends respectively secured to diametrically opposite sides of pulley 84. In either case, articulation of the distal end of probe 14 for flexing of section A as shown by dot-dash outline (FIGS. 1 and 2) is accomplished by rotating knob 86 in a counterclockwise direction when the knob is viewed from outside main body portion 12. This rotates pulley 84 clockwise as viewed in FIG. 1. Rotation of knob 86 in the opposite direction will flex distal portion A. oppositely.

Examination of nasal passages, the pharnyx, larnyx or selected portions of the alimentary canal may be accomplished simply by entering the probe 14 endwise thereinto while holding the instrument, preferably by battery handle 22, with one hand, looking into eyepiece 18. With the other hand, knob 84 is operated to direct the distal end 16 of probe 14 safely around curvatures of passageways being examined and/or in directions toward various parts of the passageways requiring inspection. When it becomes necessary to direct distal end 16 of the probe right-angularly to its plane of bending by operation of knob 86, the whole instrument 10 may be rotated by the hand on the battery handle 22. This is usually done along with manipulation of knob 86, both in amounts suitable for establishing and/or maintaining the desired "viewing" direction of distal end 16 of probe 14. At all times during the aforementioned use of instrument 10, images of the passages being traversed, i.e. their sidewalls, curved portions, and/or tissue formations whether normal or otherwise, are continually produced by optical objective 40 upon image-receiving face 44 of image-conducting fiber bundle 32. These images are conveyed through bundle 32 to its emitting face 36 and viewed in eyepiece 18.

The nasopharnyx and larnyx, or other preselected body passageways and the like can be conveniently and safely traversed by probe 14 as just described for examination and/or for facilitating endotracheal intubation of patients requiring mechanical ventilation. In the latter case, a preferred technique is to thread a conventional endotracheal tube 90 fully over probe 14 to a position adjacent main body portion 12 of instrument 10 as depicted with dot-dash outline in FIG. 1. Then, by passing the distal portion of probe 14 either transnasaly or orally into the larnyx, the probe may be used as a guide for the endotracheal tube 90. By simply manually advancing tube 90 along probe 14 it may be safely and properly positioned in the tracheal passage with minimal patient discomfort. Withdrawal of probe 14 from the implanted endotracheal tube 90 renders tube 90 immediately available for use.

A variation of the above technique for endotracheal intubation is to fit an endotracheal tube 90 over the distal portion of probe 14 of instrument 10 so that tube 90 may be guided into place by articulation of portion A or probe 14 simultaneously with traversal of the passages leading to the larnyx and trachea by probe 14 and tube 90 combination.

It is to be understood that the particular arrangement of vertebrated annuli 58 and their associated operating components are readily adaptable to manufacture and use in fiber optic probes of any desired diametral size. A typical embodiment of the invention may comprise a series of one hundred or more vertebrated annuli 58 each having an outer diametral dimension of approximately 5 millimeters.

The controlled flexing of length A of probe 14 by graduated amounts as a result of the vertebrated succession of annuli 58 provides a positive, smoothly functioning fully controllable bending action with minimal operating force (tension in wires 56) which, in conjunction with complete freedom of the remaining length of the probe to flex at will in all directions, renders endoscopy and endotracheal intubation minimally hazardous and uncomfortable to the patient and maximally effective in its intended purpose.

I claim:

1. In an articulable fiberscope instrument having a main supporting body, a fiber optic probe extending away from said main supporting body, said probe being freely laterally flexible in all directions throughout the intermediate and proximal portions of its length, a multiplicity of light-conducting fibers extending from adjacent the distal end of said probe internally therethrough into said main supporting body, a flexible image-conducting bundle of optical fibers also extending from a point adjacent said distal end of said probe internally therethrough into said main supporting body, means for directing light into proximal ends of said multiplicity of light-conducting fibers in said main supporting body for transmission of said light to said distal end of said probe and illumination of objects disposed forwardly thereof, objective lens means within said distal end of said probe, said lens means being constructed and arranged to form images of said illuminated objects in said image-conducting bundle of fibers for transmittance to said main supporting body and viewing therein, and an external flexible sheathing covering said probe, wherein the improvement comprises;

said distal end of said probe being terminated with a rigid fitting containing said objective lens means and said lens means being sealed within said rigid fitting;

a series of vertebrated annuli surrounding said image-conducting fiber bundle only distally of said probe, the number of said annuli being preselected according to the length of distal articulation desired of said fiberscope instrument, each annulus including a pair of oppositely diametrically disposed pivot lugs extending away from one side thereof and a pair of oppositely diametrically disposed sockets in its opposite side, said lugs of one annulus being engaged in sockets of an adjoining annulus to form said vertebrated relationship of said series;

said external flexible sheathing being distally terminated against said rigid fitting and connected thereto with a fluidtight seal preventing contamination of said series of vertebrated annuli by matter encountered externally of said probe;

remotely operable wire means extending from said main supporting body through said proximal and intermediate portions of said probe to said series of annuli;

anchor means fixed to said rigid fitting for receiving said wire means adjacent the most distally disposed annular of said series of annuli, said wire means being extended through said series of annuli and affixed to said anchor means;

holding means adjacent the oppositely disposed last annulus of said series of annuli for permanently retaining said vertebrated relationship of said annuli; and means in said main supporting body for receiving and selectively manipulating said wire means to remotely articulate said series of annuli and the corresponding distal portion of said probe separately and independently of said free flexing of its intermediate and proximal portions.

2. A fiberscope instrument according to claim 1 wherein said holding means for permanently retaining said vertebrated relationship of said annuli comprises a sleeve member to which said last annulus is pivotally interrelated and a laterally flexible coil member, said coil member having one end secured to said sleeve and extended coaxially away therefrom to said main supporting body for preventing retraction of said sleeve in said probe.

3. A fiberscope instrument according to claim 2 further including a second laterally flexible coil member having one end secured to said anchor means and extending coaxially therefrom over said vertebrated annuli, holding means and first coil member throughout the length of said probe to said main supporting body for preventing longitudinal displacement of said anchor means in said probe.

4. A fiberscope instrument according to claim 1 wherein the peripheral portion of each annulus is provided with a pair of oppositely diametrically disposed openings through which said wire means are extended, said openings being radially right angularly displaced from said lugs of said annulus.

* * * * *